United States Patent [19]

Knauss et al.

[11] Patent Number: 4,459,041
[45] Date of Patent: Jul. 10, 1984

[54] METHOD AND APPARATUS FOR THE INDIRECT MEASURING OF THERMAL ENERGY

[75] Inventors: Uwe Knauss, Feldkirchen, Fed. Rep. of Germany; Tiziano Ferrari, Castelleone, Italy

[73] Assignee: Cazzaniga S.p.A., Biassono, Italy

[21] Appl. No.: 337,999

[22] Filed: Jan. 8, 1982

[30] Foreign Application Priority Data

Mar. 13, 1981 [IT] Italy ............................... 20326 A/81

[51] Int. Cl.³ .......................................... G01K 17/06
[52] U.S. Cl. ....................................... 374/39; 377/21
[58] Field of Search ............. 374/39; 236/94, DIG. 8; 364/418, 505, 557; 377/16, 21

[56] References Cited

U.S. PATENT DOCUMENTS

| | | | |
|---|---|---|---|
| 3,617,713 | 11/1971 | Karlsson | 235/92 |
| 3,700,865 | 10/1972 | Ley | 235/150.53 |
| 3,854,038 | 12/1974 | McKinley | 235/151.34 |
| 3,979,952 | 9/1976 | Bornstein et al. | 73/193 |
| 4,002,890 | 1/1977 | Welin | 235/151.3 |
| 4,048,852 | 9/1977 | Sakakibara et al. | 73/193 |
| 4,157,034 | 6/1979 | Buchele | 73/193 |
| 4,221,260 | 9/1980 | Otala et al. | 165/11 |
| 4,234,927 | 11/1980 | First | 364/418 |
| 4,244,216 | 1/1981 | Dukelow | 73/190 |
| 4,363,441 | 12/1982 | Feinberg | 236/94 |

FOREIGN PATENT DOCUMENTS 1546507 5/1979 United Kingdom .

Primary Examiner—Herbert Goldstein
Attorney, Agent, or Firm—Bernard, Rothwell & Brown

[57] ABSTRACT

The method and apparatus herein described relate to the indirect measuring of thermal energy supplied to a number of user stations, for instance to all the apartments of a single building or to many buildings or the like. A temperature sensor with a voltage frequency converter provides an electric signal with a frequency which varies according to the temperature of the thermal carrier fluid. An electronic circuit processes the temperature signal through a variable multiplier which is set by respective multiplexed heat transfer ratings of the corresponding stations to produce a series of impulse trains corresponding to thermal energy consumed by the corresponding stations. Multiplexed counting devices, controlled by demand signals corresponding to fluid flow in the respective stations, receive the respective pulse trains to produce readings of the thermal energy consumed by the corresponding stations.

7 Claims, 5 Drawing Figures

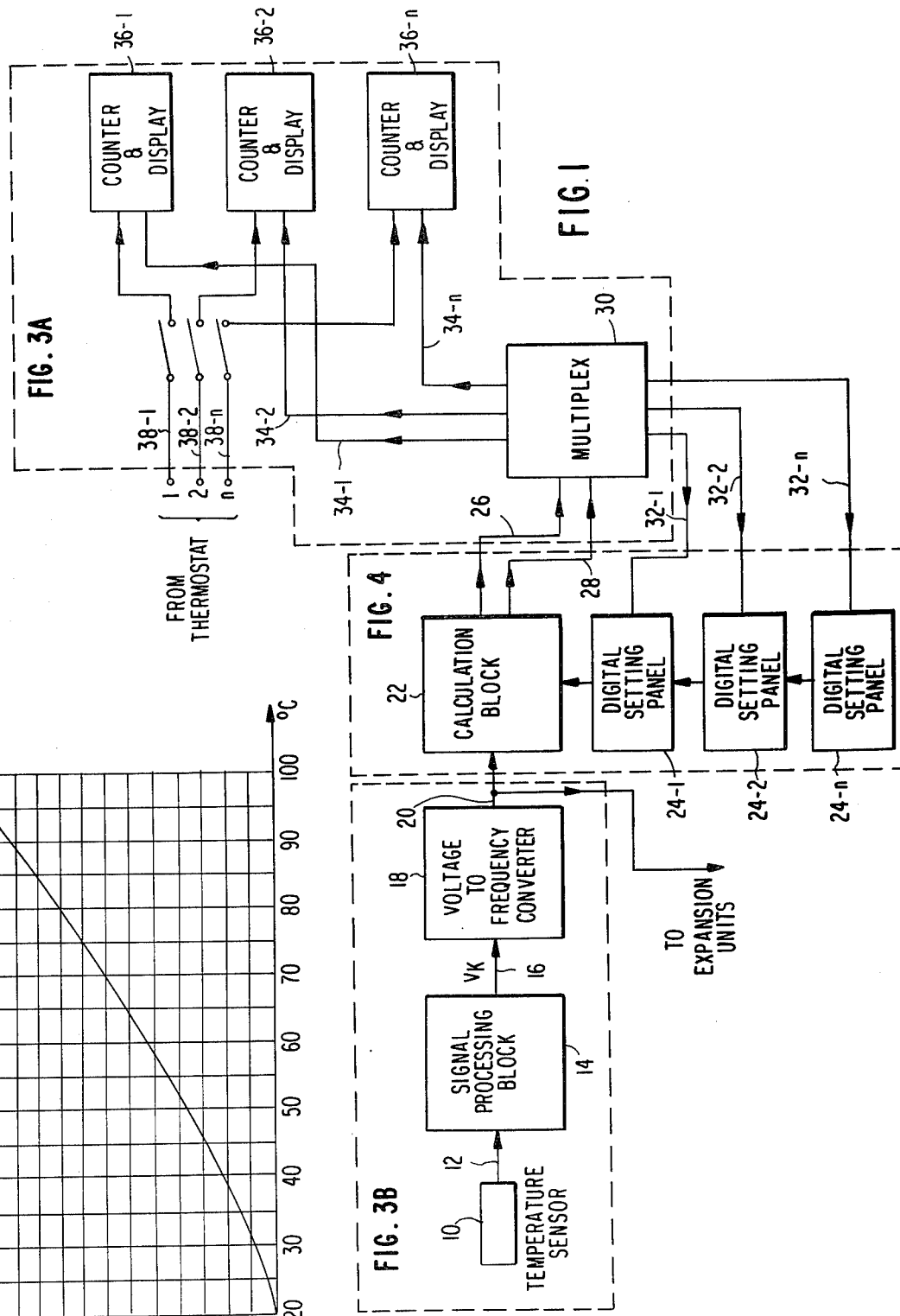

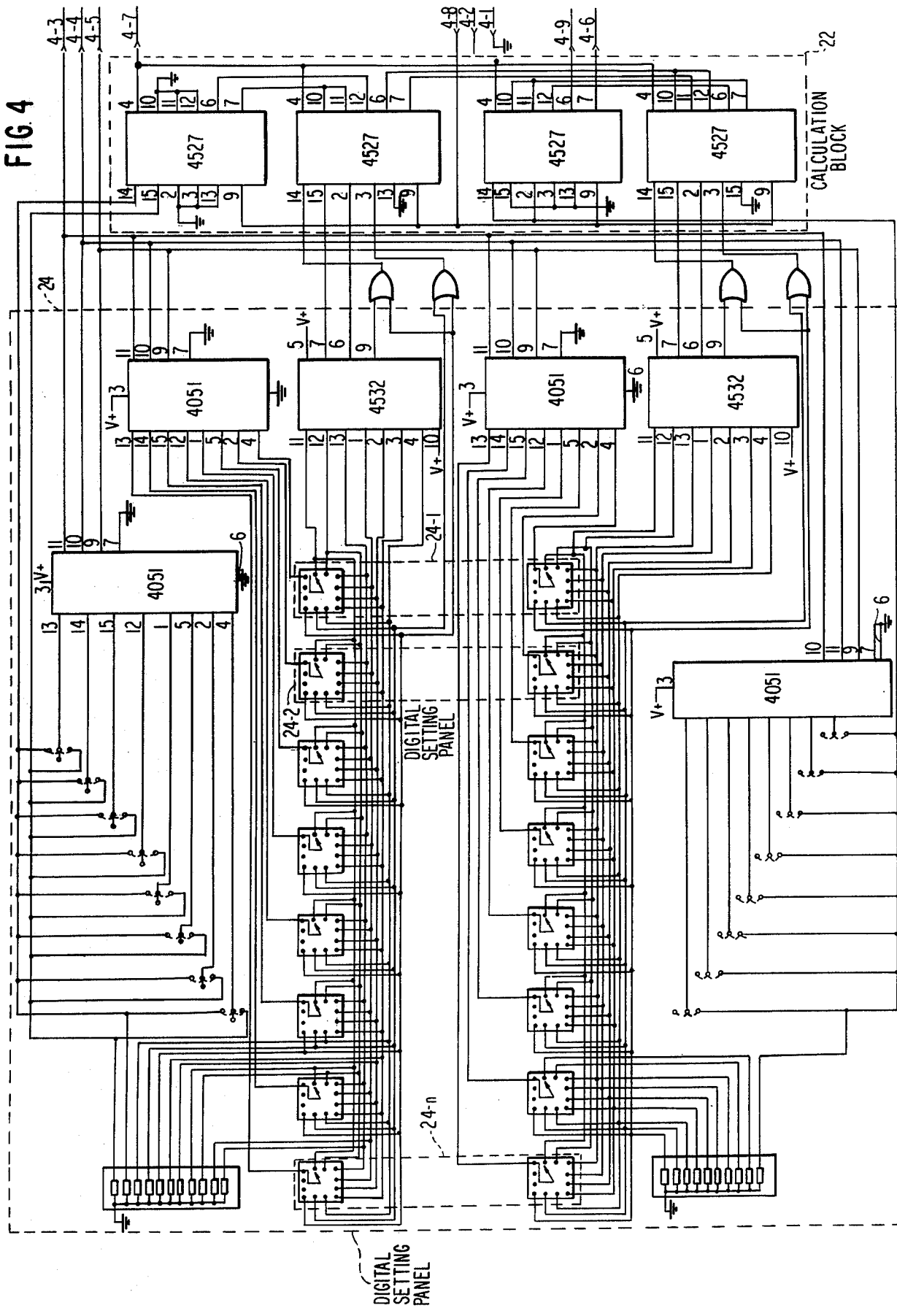

METHOD AND APPARATUS FOR THE INDIRECT MEASURING OF THERMAL ENERGY

BACKGROUND OF THE INVENTION

The present invention relates to a method and apparatus for indirectly measuring the thermal energy supplied to a number of user stations such as apartments, zones, etc.

Two kinds of measurement of the supplied heat are generally known: the direct method and the indirect one. The direct method involves the direct measurement of all the variables that are required to determine the amount of heat utilized, such as the mass of heating fluid flow, and the differential temperature Δt between the delivery and the return pipes from which the exact amount of heat transferred to the consumer can be calculated. Conversely, according to the indirect method, only some variables are directly measured, and the values of the other variables are introduced as constants or functions of measured values.

The simplest and most used indirect method is the one consisting of measuring only the service utilizing time, and it is usually carried out by using an electrical hour-counter, electrically connected in parallel with a zone valve, which can interrupt or allow the flow of the heat carrier medium upon user demand. In this way, the measurement of a single variable (demand time) allows the amount of the heat utilized by each user's station to be indirectly measured and therefore allows costs of the heat production to be shared proportionally to the time of use.

Due to the energy crisis and the costs of heat production consequently exponentially increasing, the methods for counting the heat consumption have had to be refined in order to make the users more responsible. In fact, by using the method based on the single hour-counter, the user who consumes heat at a lower temperature was penalized, whereas the user who consumes heat at a higher temperature was injustly favoured. Furthermore, the hour-counter operates, i.e. counts, without taking into consideration the differences between heat transfer ratings, i.e. number, size or efficiency of elements or registers, in each apartment or zone.

SUMMARY OF THE INVENTION

The present invention eliminates the draw backs of the prior art devices by taking in account the temperature of the fluid heat carrier and the heat transfer rating in each user's area.

In accordance with the present invention, counters displaying the heat consumption of corresponding zones, apartments, or the like are stepped by an electrical signal which is generated with a frequency or pulse rate dependent upon the temperature of a thermal carrier fluid. Each counter is also controlled by a fluid flow demand signal from the corresponding zone to prevent counting when fluid flow is stopped.

In accordance with a further aspect of the invention, the frequency of the temperature dependent signal is multiplied, for each zone, by a corresponding preset heat emission or transfer rating of the corresponding zone before being applied to the corresponding counter. The present invention has the advantage that the variation of temperature in the thermal carrier fluid according to seasonal needs, does not result in erroneous heat consumption readings due to one user having a heavy usage during a time when the thermal fluid is at a low temperature and another user having heavy usage when the thermal carrier fluid is at a higher temperature. The variation in pulse frequency eliminates these possible inequities of the prior art.

A further advantage in accordance with the second aspect is that the pulse frequency is multiplied in accordance with a preset heat emission or transfer rating of each particular apartment or zone to enable the system to operate with apartments or zones having different heat transfer rates.

A still further advantage is in that no counting occurs when the user forgets and leaves the thermostat in a position in which heating is required while the delivery heat transfer fluid is at a temperature at which a thermal exchange is not possible within the environment. In fact in cases in which the heat generator is switched off, for instance at night time, the present apparatus does not cause the meter to operate when the area valve is opened, contrary to the prior art apparatuses. With the further feature of attributing to each area a frequency change proportional to the installed heat transfer rating, it is not necessary to modify or recalculate the values of the display counters as is required by the prior art hour-counter installations.

BRIEF DESCRIPTION OF THE DRAWINGS

The preferred embodiment of this invention will be now described in an illustrative but not limitative way, with reference to the accompanying drawings, in which:

FIG. 1 is a block diagram of this apparatus;

FIG. 2 is a graph depicting the variations of coefficient K versus the delivery water temperature measured in °C.; and FIGS. 3A, 3B and 4 are detailed circuit diagrams of the apparatus with dotted lines showing the blocks of FIG. 1.

DESCRIPTION OF THE PREFERRED EMBODIMENT

Figure 3A:
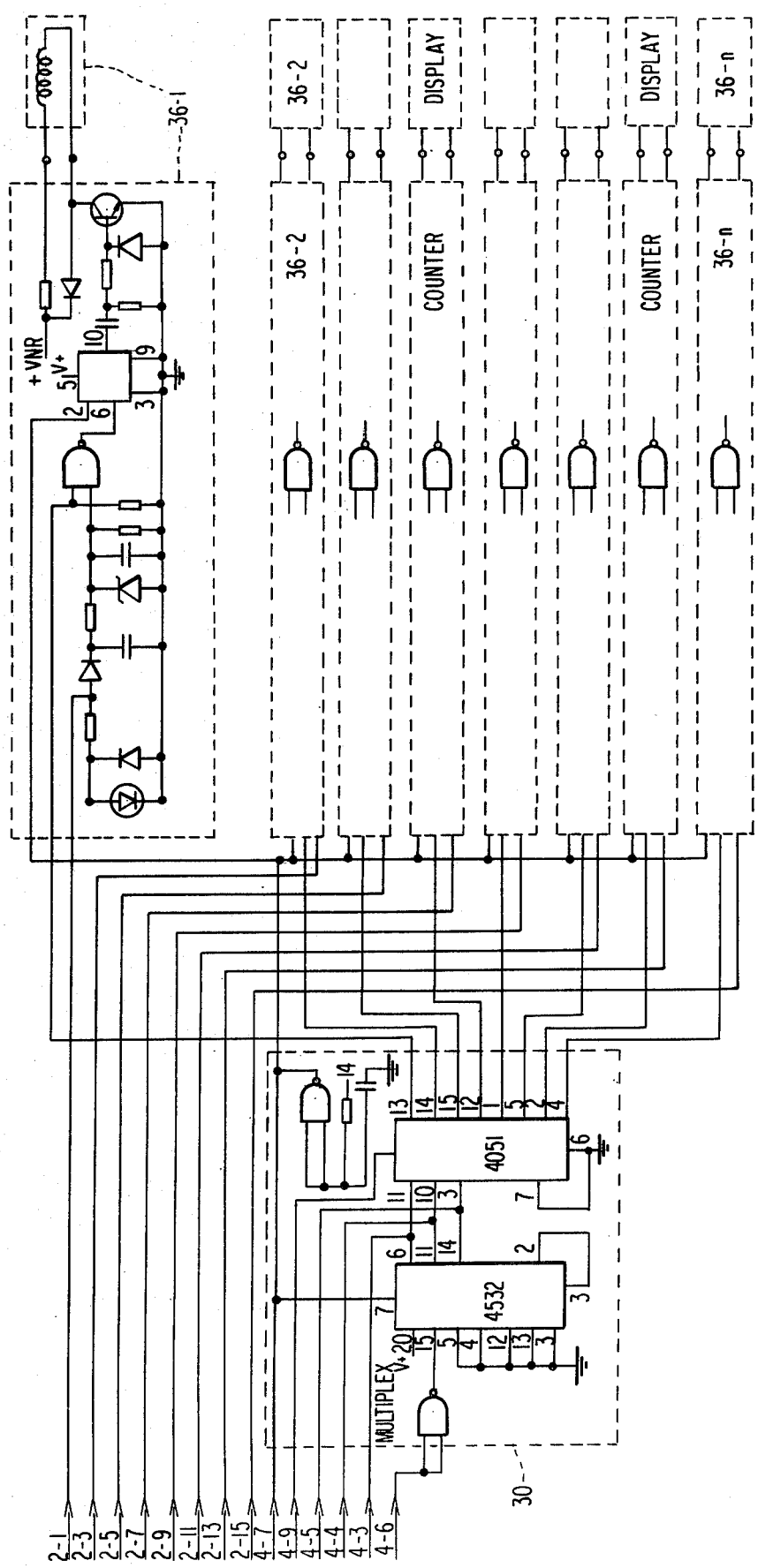

With reference to the accompanying drawings and particularly to the block diagram shown in FIG. 1 thereof, the apparatus of the present invention comprises a temperature sensor 10, which is to be dipped into the heat transfer fluid being delivered or supplied to the zones, apartments or the like. Sensor 10 preferably consists of a platinum resistance probe, which transforms, in an analogical way, the temperature to a voltage, according to a known curve characteristic of the material used, and therefore not adjustable, but valid for any kind of installation. The output 12 of sensor 10 is connected to a signal processing block 14 designed, as shown in FIG. 3B, to produce an output voltage $V_k$ which is dependent upon the delivery temperature of the heat transfer fluid and which is proportional to the adjusting factor K shown in the curve of the graph of FIG. 2. Voltage $V_K$ appearing on lead 16 is then converted to frequency F in a voltage to frequency converter 18, at the output 20 of which is therefore present a train of electrical impulses, proportional in number to the value of K. Block 18 carries out a conversion from analog to digital, and therefore all the following blocks in the logic diagram work in a digital way.

Output 20 of converter 18 is supplied to a calculation block 22, which also receives the information corresponding to the preset value of the installed heat transfer rating in the area pertaining to each user from a plurality of blocks 24-1, 24-2, . . . , 24-n, one for each user. Multiplexer circuitry 30 selects the appropriate user heat transfer ratio as well as passing the trains of electrical pulses with its corresponding frequency adjustment to the appropriate counters 36-1, 36-2, . . . , 36-N. The counting at the counters 36 takes place only if the corresponding line 38-1, 38-2, . . . , 38-n, which carries a signal from the thermostats and valves that heat is drawn at that time.

Through the lead 20, the driver apparatus of FIG. 1 can be connected to expansion units, if it is required to serve more than n users. This connection causes the same charging criterion to be applied to all the users since the analog section of the apparatus provides results common to all the users.

Figure 3B:
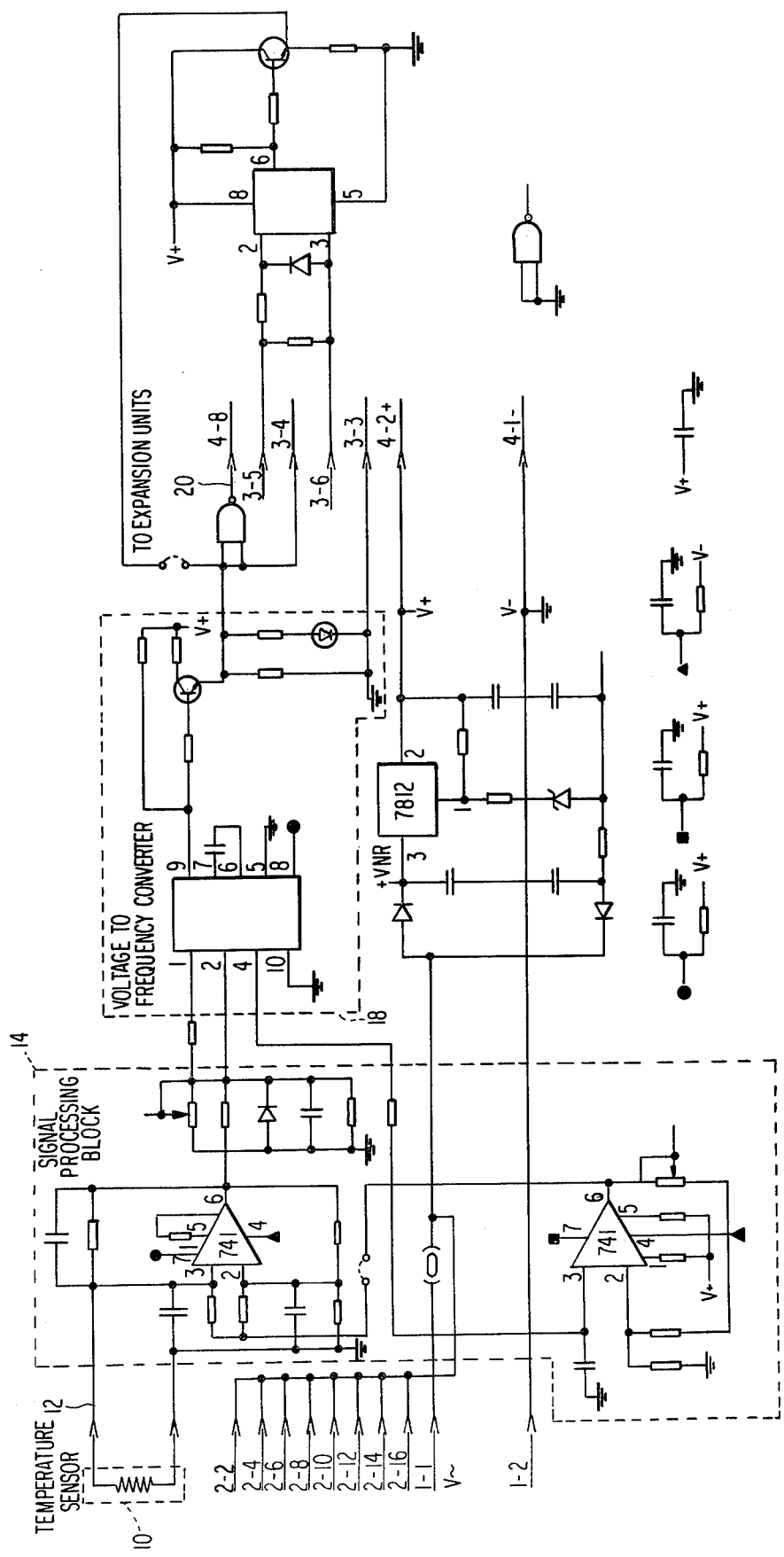

The block diagram shown in FIG. 1 has been carried out in practice as shown in FIGS. 3A, 3B and 4, in which the blocks shown in FIG. 1 have been indicated by the same reference numerals. The apparatus operates so as to measure the quantity of energy supplied to each user from only two easily measured parameters: the temperature of the supplied heat transfer fluid, and the demand signals from the corresponding user thermostats which operate the corresponding user valves. The measure of the temperature is carried out by the resistance temperature sensor 10, dipped in the delivery fluid. This signal is processed by the block 14 which processes and conditions the signal and the output 16 of which is a voltage $V_K$ proportional to the adjusting parameter K (K=f(t) ). This signal is supplied to a voltage to frequency converter 18, at the output of which a signal appears having a frequency F proportional to the temperature. This signal is null if the fluid temperature is below a predetermined value, i.e. below about 20° C. in accordance with FIG. 2.

The installation heat transfer rating and/or load, i.e. the radiating surfaces, the air quantity, or the mass of the carrier fluid to each user's station, is entered into the apparatus by means of a suitable panel 24-1 to 24-n (see FIG. 4) for the digital programming of the apparatus. At each digital programming panel 24, the rating of each user's station, or a value proportional to it, is set. The outputs of the digital programming blocks 24-1 . . . 24-N in FIG. 4 are sequentially applied by multiplexers (4051) to encoders (4532) which control rate multipliers (4527) in block 22. Each successive train of impulses from the converter 18 on line 20 is multiplied by the multipliers in accordance with the corresponding setting of the programming blocks to produce an output train of impulses reduced in number in accordance with the corresponding user heat transfer rating. The impulse trains from the calculation block 22 are sequentially applied by a multiplexer (4051) of FIG. 3A to the corresponding counters 36 for the respective zones.

The signal, indicating the passing of carrier fluid to the corresponding user's station, also reaches counters 36, through the corresponding lead 38. When this signal is present, which indicates that heat carrier fluid is passing to the area of that predetermined user's station, the impulse trains are added up and sent to a display (see FIG. 3). The scan rate for the single user stations is linked to the frequency F coming from block 22. Therefore, the adding displays will show the actual energy consumption, since there is no counting even if only signal 38 is present, which carries the request of the corresponding user's station, when signal F is absent, which indicates a fluid temperature so low that a thermal exchange cannot take place.

It is obvious that many and different variations and modifications can be applied by a person skilled in the art to the above described embodiment of the present invention. It is therefore to be understood that all these variations and modifications are encompassed in the scope of the invention, as defined in the appended claims.

We claim:

1. An apparatus for the indirect measuring and counting of the thermal energy supplied to a number of user stations, comprising in combination:
    (a) a temperature sensor providing, as its output, an electric signal depending on the temperature of the thermo-carrier fluid;
    (b) an electronic processing circuit for processing the temperature signal, providing, as its output, a processed temperature signal having a frequency dependent upon the temperature signal;
    (c) means for receiving a plurality of demand signals which correspond to the flow of the thermo-carrier fluid to the respective user stations;
    (d) means for changing the frequency of the processed temperature signal in accordance with a heat transfer rating of each corresponding user's station; and
    (e) a plurality of counting devices, one for each user's station, and enabled only by the respective demand signals for responding to said changed processed temperature signal to produce counts corresponding to the thermal energy supplied to the respective user stations.

2. An apparatus according to claim 1, in which said electronic temperature signal processing circuit comprises a voltage to frequency converter for generating a signal formed by an impulse train having a frequency proportional to the temperature, said impulse train being counted by said counting devices.

3. An apparatus for the indirect measuring and counting of the thermal energy supplied to a number of user stations, comprising in combination:
    (a) a temperature sensor providing, as its output, an electric signal depending on the temperature of the thermo-carrier fluid;
    (b) an electronic processing circuit for processing the temperature signal providing, as its output, a processed temperature signal having a frequency dependent upon the temperature signal;
    (c) means for receiving a plurality of demand signals which correspond to the flow of the thermal-carrier fluid to the respective user stations;
    (d) a plurality of counting devices, one for each user's station, and enabled only by the respective demand signals for responding to said processed temperature signal to produce counts corresponding to the thermal energy supplied to the respective user stations; and
    (e) a multiplier circuit, each counting device being operated through said multiplier circuit which is set according to a heat transfer rating of each corresponding user's station to correspondingly change the frequency of the processed temperature signal.

4. An apparatus according to claim 3, in which said multiplier circuit comprises multiplexer means and a plurality of digital programming blocks, one for each user's station, said multiplexer means sequentially scanning said digital programming blocks and the output of each programming block affecting in sequence said setting of the multiplier circuit, the output of which is sequentially connected by means of said multiplexer means to the counting device of the corresponding user's station.

5. An apparatus for the indirect measuring and counting of the thermal energy supplied to a number of user stations, comprising in combination:
   (a) a temperature sensor providing, as its output, and electric signal depending on the temperature of the thermocarrier fluid;
   (b) an electronic processing circuit including a voltage to frequency inverter for processing the temperature signal to generate a processed temperature signal formed by impulse trains, each impulse train having a number of impulses proportional to the temperature;
   (c) a multiplier circuit for changing the number of impulses in successive impulse trains according to heat transfer ratings of the corresponding user's stations;
   (d) means for receiving a plurality of demand signals which correspond to the flow of the thermal-carrier fluid to the respective user stations; and
   (e) means, including demultiplexer means and a plurality of counting devices, one for each user's station, and enabled only by the respective demand signals for responding to respective impulse trains in said processed temperature signal to produce counts corresponding to the thermal energy supplied to the respective user stations.

6. A method for the indirect measuring of the thermal energy supplied to a number of user stations, comprising:
   (a) detecting the temperature of the thermal energy carrier fluid to produce a temperature signal;
   (b) converting the temperature signal into an electric signal having a frequency depending on the temperature;
   (c) processing the electric temperature signal;
   (d) multiplying said processed temperature signal by means of a rate proportional to a heat transfer rating of each user's station;
   (e) detecting demand signals corresponding to the closing or opening of each of a plurality of cut-off members which cut off the thermo-carrier fluid, one for each user's station; and
   (f) operating each of a plurality of counting devices, one for each user's station, by means of the multiplied processed temperature signal only when an opening of the corresponding cut off member has been detected.

7. A method according to claim 6 in which processing the electric temperature signal consists of forming impulse trains, the impulse repeating frequency of which depends on the temperature of the heat carrier fluid.

* * * * *